E. H. GALLIGAN.
EYE SYRINGE AND MASSAGE DEVICE.
APPLICATION FILED NOV. 3, 1917.
1,350,719.
Patented Aug. 24, 1920.
2 SHEETS—SHEET 1.
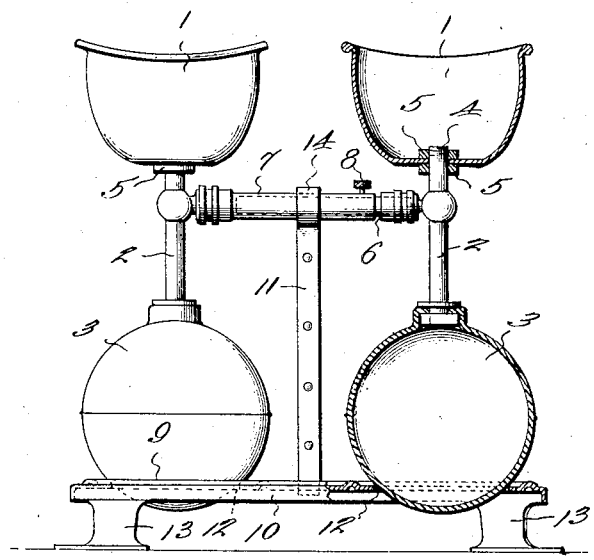
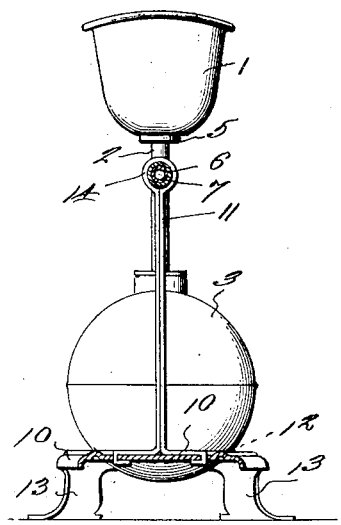
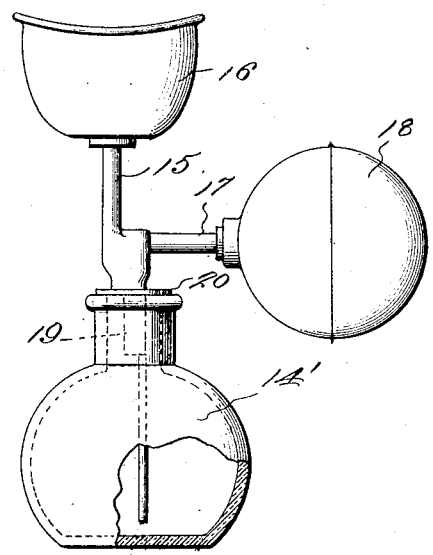
Inventor
E. H. Galligan,
By Victor J. Evans
Attorney
Witnesses

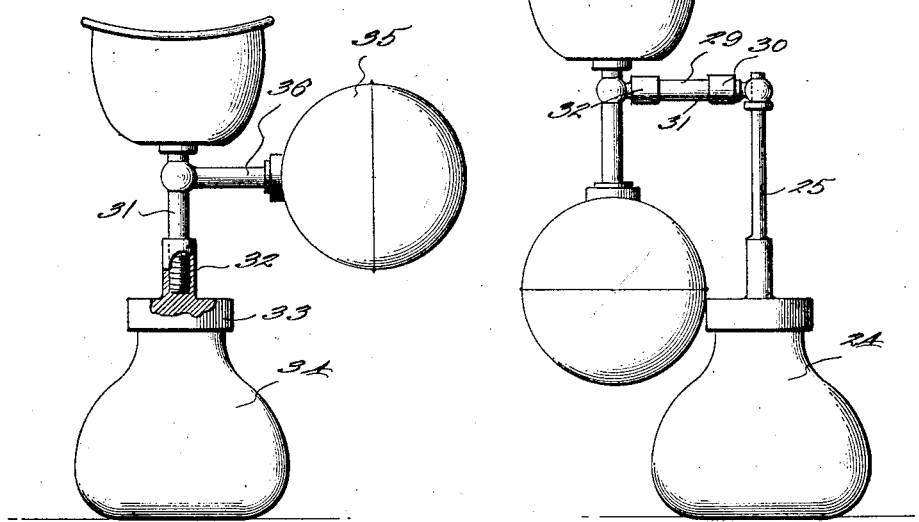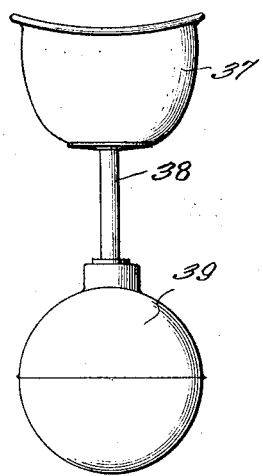

UNITED STATES PATENT OFFICE.

EDWARD H. GALLIGAN, OF PROVIDENCE, RHODE ISLAND.

EYE SYRINGE AND MASSAGE DEVICE.

1,350,719.  Specification of Letters Patent.  Patented Aug. 24, 1920.

Application filed November 3, 1917. Serial No. 200,143.

*To all whom it may concern:*

Be it known that I, EDWARD H. GALLIGAN, a citizen of the United States, residing at Providence, in the county of Providence and State of Rhode Island, have invented new and useful Improvements in Eye Syringe and Massage Devices, of which the following is a specification.

This invention is an improved eye syringe and massage device which is adapted for use for syringing and also for massaging the eye, the object of the invention being to provide an improved device of this character which is simple in construction, is readily adjustable, and which can be readily used.

The invention consists in the construction, combination and arrangement of devices hereinafter described and claimed.

In the accompanying drawings:—

Figure 1 is an elevation, partly in section, of an eye syringe and massage device constructed and arranged in accordance with my invention.

Fig. 2 is a vertical transverse sectional view of the same.

Fig. 3 is an elevation, partly in section, of a modified form of the same.

Fig. 4 is a similar view of another modified form of the same.

Fig. 5 is a similar view of another modified form of the invention.

Fig. 6 is a similar view of another modified form of the invention.

Referring first to the form of the invention shown in Figs. 1 and 2, a pair of eye cups 1 are employed each of which is connected by a tube 2 with a bulb 3, each tube having a threaded upper end which extends through an opening in the bottom of one of the eye cups, is provided with a discharge opening 4 and is secured to the bottom of the eye cup by nuts or rings 5 which are screwed to the tube and between which the bottom of the eye cup is firmly clamped.

The tubes are connected together by a pair of members 6, 7 the member 6 being telescopically fitted in the member 7, said member 7 having a tubular portion to receive the member 6. Hence the bar formed by the members 6, 7 and which connects the tubes with their eye cups and bulbs together, is longitudinally adjustable, so that the eye cups may be arranged to fit all persons. A set screw 8 is provided in the tubular member 7 to clamp the member 6 and secure said members at any desired adjustment.

I also provide a stand 9 for the combined eye syringe and massage device, the said stand comprising a base 10 and a standard 11 which extends upwardly from the center of the base. The base is provided with openings 12 near its ends to receive the lower portions of the bulbs and is also provided with supporting feet 13. The standard has an eye 14 at the upper end, through which the bar which connects the tubes of the eye cups and bulbs passes. The device may be used either when arranged on or detached from the stand. Preferably the stand, the standard, and the eye cups are made of aluminum but the same may be made of any suitable material within the scope of my invention.

In Fig. 3 of the drawings I show a modified form of my invention in which a bottle 14' is employed both as a supporting stand and as a container for the liquid used in treating the eye. The tube 15 which discharges through the eye cup 16 is provided with a horizontal arm 17 to which the bulb 18 is attached and is also provided, at the lower end, with a nipple 19 to fit in an opening in the cork 20 of the bottle and with an intake tube 20 which extends down into the bottle. When the bulb is operated liquid from the bottle will be drawn up through the tube 20 and discharged through the tube 16 into the eye cup, as will be understood.

In Fig. 4 of the drawings I show another modified form of my invention in which the tube 31 is screwed at its lower end in the tubular arm 32 of a cap 33 at the upper end of a glass or other suitable stand 34, the bulb 35 being attached to a horizontal arm 36 of the tube.

In Fig. 5 of the drawings I show another modification of my invention in which a solid glass or other suitable stand 24 is employed which has a standard 25 extended from its upper end. The eye cup is indicated at 28. The tube of the eye cup is connected by an arm 29 to the upper end of the standard, said arm being pivotally mounted on the upper end of the standard and comprising members 30, 31, 32 which are screwed together as shown.

In Fig. 6 I show another modified form of my invention in which the eye cup 37 has its tube 38 provided at the outer end with a bulb 39.

In the forms shown in Figs. 1, 4, 5 and 6 the liquid is placed in the eye cup or cups and drawn into the bulb or bulbs by suction and then forced back by pressure up in the cup or cups as will be understood.

My improved combination eye syringe and massage device enables the eye to be treated with a liquid or massaged as will be required, and as will be understood.

While I have herein shown and described a preferred form of my invention, I would have it understood that changes may be made in the form, proportion and construction of the several parts, without departing from the spirit of my invention and within the scope of the appended claim.

Having thus described my invention, I claim:—

An eye syringe comprising a pair of cups, a tube for each cup, a bulb associated with the end of each tube, each tube projecting through an opening in the cup supported thereby and having its upper end threaded, a collar on each tube for supporting the bottom of said cup, a nut associated with the threaded end of said tube, means for connecting the cups for lateral adjustment, and a support to both of said cups.

In testimony whereof I affix my signature.

EDWARD H. GALLIGAN.